No. 853,858. PATENTED MAY 14, 1907.
B. E. BECHTEL.
BRICK, BLOCK, OR TILE CUTTER.
APPLICATION FILED NOV. 19, 1906.
2 SHEETS—SHEET 1.
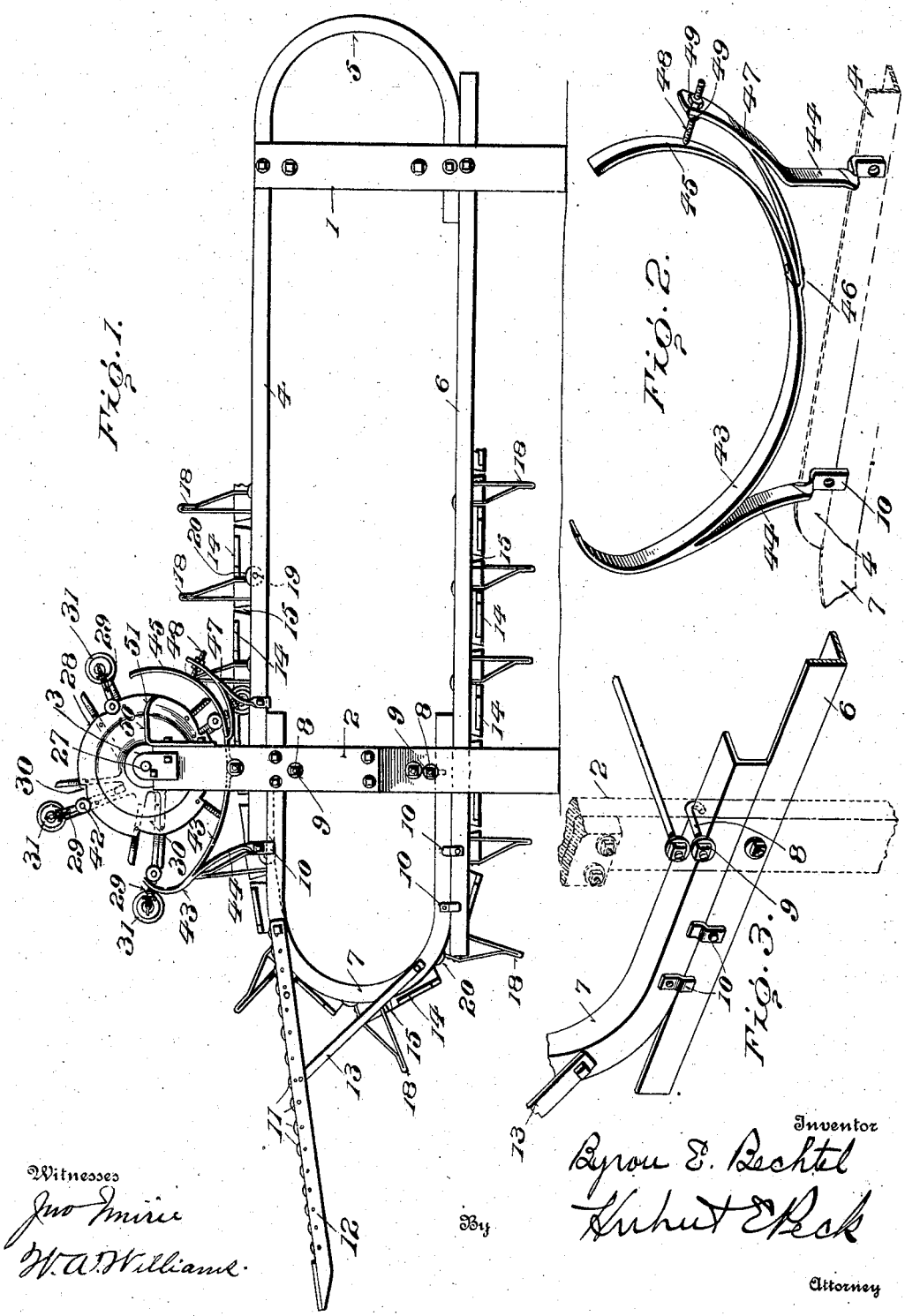
Witnesses
Jno Muire
W. A. T. Williams.
Inventor
Byron E. Bechtel
Hubert E. Peck
By
Attorney No. 853,858. PATENTED MAY 14, 1907.
B. E. BECHTEL.
BRICK, BLOCK, OR TILE CUTTER.
APPLICATION FILED NOV. 19, 1906.
2 SHEETS—SHEET 2.
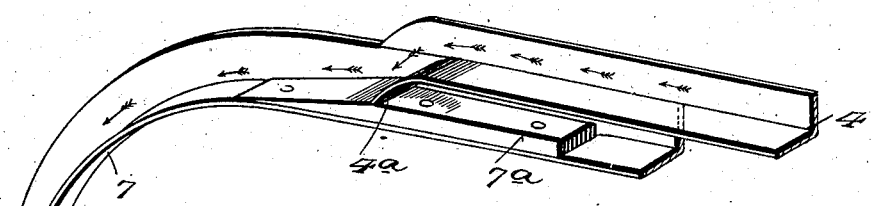
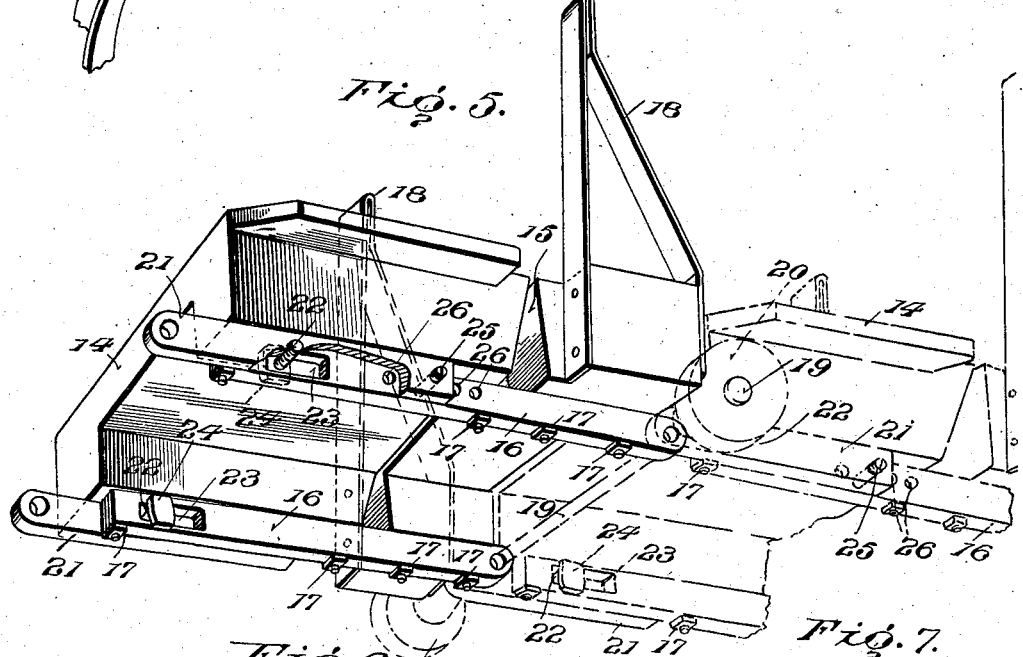
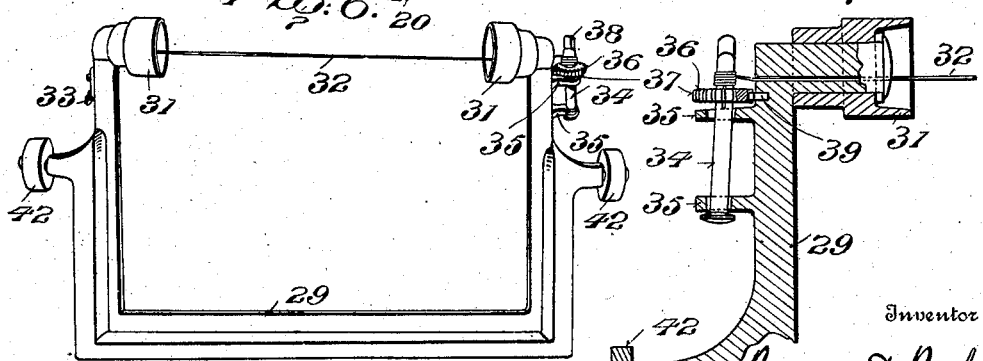
Witnesses
Inventor
Byron E. Bechtel
By
Attorney

UNITED STATES PATENT OFFICE.

BYRON ERB BECHTEL, OF WATERLOO, ONTARIO, CANADA.

BRICK, BLOCK, OR TILE CUTTER.

No. 853,858.   Specification of Letters Patent.   Patented May 14, 1907.

Application filed November 19, 1906. Serial No. 344,066.

*To all whom it may concern:*

Be it known that I, BYRON ERB BECHTEL, a subject of the King of Great Britain, residing at Waterloo, Province of Ontario, Dominion of Canada, have invented certain new and useful Improvements in Brick, Block, or Tile Cutters; and I do hereby declare the following to be a full, clear, and exact description of the invention, such as will enable others skilled in the art to which it appertains to make and use the same.

This invention relates to certain improvements in brick, block or tile cutters; and the objects and nature of the invention will be readily understood by those skilled in the art in the light of the following explanation of what I now consider the preferred embodiment shown in the accompanying drawings from among other constructions and arrangements within the spirit and scope of my invention.

An object of the invention is to provide certain improvements in that class of cutters wherein an endless table or carrier is propelled by and supports a continuously moving bar of plastic material which is severed into uniform lengths by a cutter rotating with the table, with the end in view of rendering the table adjustable to vary the lengths of the uniform bricks, or sections into which the continuous bar is to be severed.

A further object of the invention is to provide certain improvements in brick, block or tile cutters, whereby the sections of the endless traveling table can be uniformly varied in length, to vary the length of the sections cut from the clay bar, and whereby the track for said table can be adjusted to maintain the table under the desired tension.

A further object of the invention is to provide certain improvements in the cutting reels and controlling devices of endless cutting tables, whereby the cutting reel controlling devices can be adjusted to cause proper co-operation between the reel and endless table where the table is varied in length.

A further object of the invention is to provide certain improvements in details and features of the cutting apparatus, whereby a highly efficient and durable cutting table will be produced.

The invention consists in certain novel features in construction, arrangements, and combinations of parts as more fully and particularly set forth hereinafter.

Referring to the accompanying drawings:—Figure 1, is a side elevation, a portion of the endless table being broken away. Fig. 2, is a detail perspective view of one of the cam tracks controlling the operative position of each cutting wire frame, dotted lines indicating portions of the angle iron tracks. Fig. 3, is a detail perspective of the overlapping portions of an adjustable curved end track section and a bottom track section, dotted lines indicating an upright. Fig. 4, is a detail perspective showing the overlapping ends of a curved adjustable end track section and a straight top track section. Fig. 5, is a detail perspective of an endless traveling table section, portions being broken away, dotted lines indicating an adjacent section. Fig. 6, is a perspective view of one of the cutting reel wire frames. Fig. 7, is a sectional view through one arm of said frame, illustrating the wire fastening and tightening device.

In the drawings, 1, are a pair of supporting uprights arranged at the receiving end of the cutter, and 2, are a pair of supporting uprights arranged at the delivery or discharge end of the cutter, and extended vertically above the horizontal plane of the top ply of the traveling table to receive the journal boxes 3, of the rotary cutting reel.

A pair of parallel endless continuous tracks are provided for the endless traveling table, and these tracks are secured to and supported by said uprights and arranged at the inner faces or sides thereof. In the specific example illustrated, I show said tracks formed by lengths of angle iron clamped or otherwise bolted to the uprights to form the straight horizontal upper tracks 4, and bent to form the U-shaped curved tracks 5, at the receiving end of the cutter.

Straight sections of angle iron are also employed to form the lower or return horizontal tracks 6, at their rear ends extending under the lower ends of the curved end tracks 5, so that table section rollers can pass up from the tracks 6, to engagement with the curved tracks 5. The parallel spaced similar curved tracks 7, at the delivery end of the cutter are each formed by a length of angle iron bent into U-shape, with its upper straight end portion arranged immediately under and parallel with the end portion of the corresponding track portion 4, and its straight lower end portion arranged immediately over and parallel with the end portion of the corresponding track portion 6.

The arrangement is such that the endless table rollers drop from ends of upper track sections 4 into curved end tracks 7, and pass down along the same and drop from the horizontal lower portions of said curved sections onto the tracks 6.

The curved track section 7, constitutes an adjustable section of the endless track whereby the endless track can be increased or diminished in length to maintain the endless table under the desired tension even though the same be somewhat varied in length by adjustment. To accomplish this result, I adjustably secure the curved sections 7, to permit adjustment thereof longitudinally while the same is maintained in the vertical plane of the endless track. Various means can be employed for this purpose, although in the specific example illustrated, I show the straight or horizontal ends of each curved track 7, clamped to its adjacent upright by hook or clip bolts 8, passed loosely through the upright and provided with tightening or clamping nuts 9, at the outer face of the upright; the hooked inner ends of the bolts engaging the inner edges of the angle iron. The U-shaped sections can hence be rigidly clamped in position and to the uprights by tightening the bolts through the medium of their nuts. By loosening the nuts and consequently the bolts, the track sections 7 will be loosened, and can then be moved longitudinally to increase or diminish the length of the endless track, the sections 7, sliding on and guided by the fixed straight tracks 4, 6, during adjustment.

Lugs or lips 10, can be secured to the outer sides of the fixed track sections to vertically and loosely overlap the outer side faces of the adjustable sections 7, to guide the same and prevent lateral movement thereof, or if desired said guide lips 10, can be secured to the adjustable sections 7, and loosely and vertically extend beside the fixed track sections and serve the same purpose.

The curved adjustable track sections 7, preferably carry the brick receiving platform or table, which extends downwardly and forwardly from the delivery end of the cutter to receive the sections or bricks from the endless traveling table. In the specific example illustrated, this platform consists of a series of idler rollers 11, mounted in and extending between longitudinal side bars 12, at their rear ends bolted or otherwise secured to the upper portions of the adjustable curved track sections 7, and braced by inclined braces 13, at their upper ends secured to said side bars 12, and at their lower ends secured to the lower portions of track sections 7.

The endless traveling table which carries and is propelled by the clay or other plastic material bar projected from the die of a continuous bar forming machine, comprises a series of similar pivotally united blocks or sections provided with rollers traveling on the before-mentioned tracks. Each section comprises a floor 14 having a flat top face usually rectangular and of about the length of the blocks into which the clay bar is severed. Each floor is transversely divided into sections of different lengths by a vertical slot 15, to receive the cutting wire after it has passed through and severed the clay bar. This slot is located between the center of the length of the table section and one end thereof, usually the rear (in the direction of movement of the top ply of the table) end thereof. To provide for this cutting wire receiving slot, I usually form each table section of two blocks of different lengths and both rigidly secured on the two parallel spaced longitudinal bottom bars 16, by bolts 17, or other suitable means. The two blocks are spaced to form the cutting wire receiving slot between their adjacent edges. The two cutting reel actuating standards 18 of each table section are usually arranged at the rear end thereof and are usually secured to the projecting ends of the rear short block just in rear of the cutting wire slot.

The table sections in the specific example illustrated, are arranged end to end, and are pivotally connected by cross shafts or axles 19, on the ends of which the rollers 20, are located, beyond the side edges of the table sections. The rollers 20, carry and support the endless table, and travel on the side flanges of the angle irons forming the tracks as hereinbefore explained. The table sections are pivotally joined together through the medium of the longitudinal bottom bars 16, which are usually formed of metal and rectangular in cross section, the shafts 19, before mentioned, and certain adjustable extensions of the bars 16. I show the rear ends of the bars 16 of each table section, formed with transverse alined bearing openings or perforations receiving the shaft 19, which couples the section to the next section behind and which also passes through corresponding bearing alined openings in forward extensions 21, from the bars 16, of said section behind. Each extension 21, is in the form of a bar, usually a bar of metal rectangular in cross section, resting against the bottom of the table section and parallel with and resting against a side face of its longitudinal bar 16.

The two extension bars 21, of each table section project forwardly beyond the same and overlap the rear ends of the bars 16, of the next section to the front, and the shaft 19, passes loosely through the bearing openings of said four bars to form the hinge or pivotal connection as hereinbefore described. The extension bars of each section are rendered longitudinally adjustable of the section for the purpose of varying the distance between the cutting wire slots, or in other words to vary the length of each table section. Various means or devices can be employed for this purpose. As a convenient means, I provide devices for adjustably clamping each extension to its bar so that by loosening such devices, the extensions can slide longitudinally of the bars and table section. In the specific example illustrated, the extensions overlap the bars and are arranged at the outer edges thereof, and each extension is provided with a clamping bolt 22, screwing into a threaded hole or socket therein, and projecting laterally therefrom loosely through a longitudinal slot 23, in the end portion of the bar 16, and provided with an angular clamping head 24, at the inner side face of bar 16. The extension can be rigidly clamped to the bar 16, by tightening said bolt, and when the bolt is loosened the extension can be moved longitudinally the desired distance, on releasing the set pin 25, arranged at the inner end of the extension and engaging any one of a series of set holes 26, said set holes being arranged in a series longitudinally of the bar 16. The set holes are spaced certain distances apart, say for instance, a quarter of an inch apart, and hence the extensions of all the table sections can be accurately and uniformly adjusted the desired distance and accurately set at the desired adjustment, so that the table sections will all be uniform in length.

The cutting reel comprises a horizontal cross shaft 27, mounted in the journal boxes 3, on the upper ends of the uprights 2; the end heads 28, rigid with said shaft, and the movable and removable cutting wire frames 29, projecting about radially of the reel, and confined between said heads and slidable in the guide ways 30, arranged at the inner faces of said heads, about radially of the reel and usually tangentially of the axis on which the reel rotates.

Each cutting wire frame is U-shaped, and the outwardly extending arms or legs thereof are confined in a pair of guide ways 30, one of each head; the guide ways being preferably of greater width than the frame legs whereby the frame has a limited rocking movement in the reel. The legs of the cutting wire frames project beyond the reel heads, and at their outer ends carry the idler guide wheels or rollers 31, mounted to turn on suitable studs or spindles confined to and projecting laterally from the frame ends. Each cutting wire frame has a cutting wire 32, stretched between the frame ends and extending between and passing through the two guide rollers 31. Each frame end has a lateral perforation or hole through which the cutting wire extends, and at the outer edges of said ends, means are provided to secure the wire ends. If so desired, one end of the wire can be detachably looped around a hook or lug 33, rigid with and at the outer edge of one frame end, while the outer end of the wire is secured to a wire tightening device arranged at the outer edge of the opposite frame end. This wire tightening device consists of a rotary spindle 34, passing loosely through a pair of spaced lugs 35, projecting laterally from the outer edge of the frame end and usually formed integral therewith.

The lower end of the spindle preferably has a head below the lower lug, to confine the spindle against upward movement through and from the lugs. Intermediate its length and above the upper lug, the spindle is formed or provided with a disk or flange 36, formed around its circumferential edge with ratchet teeth 37. Immediately above the ratchet disk, the spindle is formed to secure or receive the end of the cutting wire and to cause the wire to coil or wrap around the spindle as the spindle is rotated by any suitable tool applied to its squared or angular upper end 38. The spindle is held against retrograde rotation by the tension of the cutting wire which holds the ratchet wheel or disk of the spindle against a tooth or edge 39, projecting from the adjacent face of the frame end, and engaging the ratchet teeth or notches of said disk. I usually form the tooth 39, by the beveled or V-shaped outer end of a hard metal pin inserted in a hole or socket formed in the metal of the frame. The upper bearing lug or ear 35, usually has a somewhat elongated bearing opening for the spindle, permitting the same to move outward when relieved or partially relieved from the tension of the cutting wire, and thereby enabling the ratchet disk to clear the tooth 39, as the spindle is rotated to tighten the wire or to release the wire in the event that a new wire is to be applied. I also can, if desired, incline the top face of the upper bearing ear 35, downwardly and outwardly and thereby cause the ratchet disk resting thereon, to slide outwardly on said inclined face, when the spindle is loosened, that is free from the tension or pull of the wire, whereby the loosely mounted and confined spindle normally tends, when the cutting wire frame is at the top of the reel, to swing outwardly with its ratchet disk clear of the tooth 39. The spindle is drawn toward the frame end with the ratchet disk tightly against the tooth, as the cutting wire is tightened by being wrapped around the spindle.

If desired, tightening devices, such as just described, can be provided on both frame ends and for both ends of the wire, instead of the rigid hook 33, at one end. Wire breakage is materially reduced by the employment of such tightening devices; in case of breakage, the broken wire can be removed and a new one easily and quickly applied; and should a wire break and the reel continue rotating the spindles or other parts will not drop from the machine.

The cutting reel is rotated by the engagement of the reel actuating standards of the endless table sections with the guide rollers 31, of the cutting wire reels. During the rotation of the reel, each cutting wire frame as it travels downwardly slides outwardly by the action of gravity until its guide rollers engage the standards or uprights 18 of an advancing endless table section. As the standards advance, the reel is rotated thereby and the guide rollers travel downwardly along the standards carrying the cutting wire through the clay bar and into the cutting wire receiving slot of the table sections, and as the cutting wire frame passes beyond the vertical position, the guide rollers travel up along the standards, carrying the cutting wire on its return movement between the faces of the clay bar formed by the cut just completed.

Means are provided to control the outward movement of each cutting wire frame. For this purpose, I show the outwardly extending ends of each frame formed with laterally projecting lugs beyond the reel heads carrying stop rollers 42. These rollers 42, travel on cam or guide tracks or ways 43 arranged at the opposite ends of the reel, and usually between the uprights 2, and the reel actuating standards of the endless table. The two tracks 43, are preferably similar, and each, in the specific example shown, is composed of one or more metal bars supported by metal brackets 44, secured to and extending up from the angle bars forming the horizontal top track section. The tracks 43, are curved to properly hold the cutting wire frames in the reel and to guide the same while passing into, through, and from the clay bar.

The rear ends 47, of the metal bars forming the lower and forward portions of the guide tracks, are deflected rearwardly from the paths traveled by the guide rollers, and adjustable rear track sections 45, are provided, each consisting of a curved upwardly extending bar, at its lower end hinged or pivotally joined in the track 43, at an offset 46, in the bar forming track 43, where end 47 is deflected from said track.

Each adjustable track section 45, is adjustable toward or from the axis of the cutting reel, by a stop bolt 48, adjustably passing through the end 47, and held in the desirable position by nuts 49. The adjustable track section 45, determines the distance the cutting wire frames move rearwardly or outwardly, at the rear of the reel, to meet the advancing table section uprights. By adjusting said movable track sections inwardly or outwardly the stop rollers of the cutting wire frames can be engaged and the frames always guided to engagement with the advancing standards at the proper point with relation to the position of said standards. This point varies according to the adjustment of the table sections, that is according to the uniform length to which the sections may have been adjusted and the consequent distances between the standards thereof.

If so desired, I can provide cams to engage the stop rollers of the cutting wire frames and force said frames outwardly as said frames about reach the horizontal position on their downward course. For instance, for this purpose I show metal bars 50, fixed to the uprights 2, and having horizontal rearwardly extending ends about in the horizontal plane of the reel axis and with downwardly deflected cam extremities 51, arranged to be engaged by the stop rollers of the frames when said frames are at their limit of inward movement in the reels. The cams will force the frames outwardly and start them on their rearward movement toward the advancing standards.

The front ends of the upper horizontal tracks 4, preferably are arranged at such a point with respect to the cutting reel, that the table section rollers will drop from said tracks 4, along the downturned ends 4ª, thereof to the upper portions of the end adjustable track sections 7, and onto the inclined blocks 7ª, secured thereto, and thereby tilt each table section while passing from the ends of the track sections 4 so as to tilt the clay block thereon, forming a comparatively wide space between the severed clay faces for the upward or return movement of the cutting wire.

It is desirable that the bricks after being burned, should be of uniform length. Clay varies in quality, and some clay will shrink during the burning more or to a greater extent than other clay, and these different qualities of clay are often encountered in the same locality. It hence becomes necessary to cut some clay into different lengths than other portions of clay so that the green bricks when burned will be of uniform length. Hence, the desirability of providing the cutter with an adjustable traveling table, that is one wherein the sections of the table can be varied in length according to the quality of the clay being severed thereby.

I have described in detail means whereby a table can be adjusted in length, and also means whereby the endless track for the table can also be adjusted in length, but I do not wish to limit myself to the constructions described nor do I wish to limit the adjustable table to employment in connection with an adjustable track, and other means for adjusting the table can be employed than those shown, and it is evident that various changes and modifications might be made and resorted to in the constructions set forth, and parts might be added to or removed therefrom, without departing from the spirit and scope of my invention.

What I claim is:—

1. A cutting device for severing plastic material bars into sections of uniform length comprising a cutting reel, an endless traveling table consisting of pivotally united sections, each provided with a reel actuating portion, means whereby the spacing of said portions can be varied to vary the length of the sections cut from said bar, and means whereby the spacing of said portions is rendered uniform throughout said table, whereby said sections cut from the bar will be uniform in length, substantially as described.

2. A cutting device for severing plastic material bars into sections uniform in length comprising an endless traveling table consisting of sections, pivotal connections between the sections, each connection comprising a member movable longitudinally of a section whereby the spacing between all of the sections can be varied, to vary the length of plastic sections produced, each section provided with set means, whereby the spacing between all the sections is rendered uniform for the production of plastic material sections of a uniform length.

3. A cutter for severing plastic material bars into lengths comprising a rotary cutting reel, and an endless traveling table receiving said bar and co-operating with said reel in severing said bar into sections of uniform length, said table consisting of sections, pivotal connections between and spacing all the sections, each pivotal connection comprising a member movable longitudinally of a section and provided with means to maintain uniform spacing between the sections, whereby the spacing between the sections can be varied to vary the lengths of plastic material produced and whereby when varied uniform lengths of plastic material will be produced.

4. A cutter of the character substantially as described comprising a cutting reel, endless tracks, and an endless traveling table mounted on said tracks consisting of pivotally united sections, each section comprising a floor having reel actuating standards, longitudinal bars rigid with said floor and provided with longitudinally adjustable extension bars pivotally joined to the longitudinal bars of the adjoining sections.

5. A cutting device of the character substantially as described, comprising an endless table composed of sections, each section having cutting reel actuating standards and longitudinal bottom bars rigid with the sections and provided at one end thereof with longitudinally adjustable extensions, set pins and holes being provided to determine the adjustment of each extension, clamping bolts for locking the extensions, cross shafts passing through said bars and extensions and pivotally uniting the sections, rollers on the cross shafts, a frame having a track for the rollers, and a cutting reel.

6. In combination, in a cutting device, an endless track, means for supporting the same, said track comprising curved ends, one end formed by U-shaped longitudinally adjustable track sections, and an endless traveling table mounted on said track.

7. A cutting device for cutting plastic material bars, comprising an endless traveling table, an endless track therefor, said track having horizontal top and bottom sections and curved end portions between said sections, one end portion having straight upper and lower portions slidably engaging the upper and lower horizontal track sections, and means rendering said end portion longitudinally adjustable.

8. In combination, in a cutting device for severing plastic material bars into lengths, a cutting reel, an endless traveling table comprising pivotally united sections and provided with means for adjusting the length of each section, an endless track for said table provided with means for varying the length thereof, and a support for said track.

9. A rotary cutting reel for a cutting device for severing plastic material bars into lengths comprising a cutting wire carrying frame, a cutting wire stretched between the ends thereof, and a tightening and securing device for said wire comprising a rotatable spindle mounted on an end of said frame and having a ratchet disk, a tooth set in said arm to engage said teeth of the disk, said wire being attached to and adapted to wind on said spindle, the tension of the wire on the spindle holding said disk to said arm.

10. In a cutter for severing plastic material bars into lengths, in combination an endless traveling table having reel actuating standards and means whereby the spacing of the standards can be varied, a rotary cutting reel comprising a movable cutting wire frame, and controlling cam tracks for said frame having movable sections and means for supporting said movable sections.

11. In a cutter for severing plastic material bars into lengths, a traveling endless table having cutting reel actuating projections, a rotary cutting reel having inwardly and outwardly movable cutting wire frames, means to limit and control the movements of said frames, and fixed cams for throwing said frames successively outwardly as they pass downwardly.

12. In combination, in a cutter for severing plastic material bars into lengths, an endless traveling table having cutting reel actuating portions, a rotary cutting reel having inwardly and outwardly movable cutting wire frames, each frame having a lateral stop projection, a cam track along which said projections move, and a cam successively engaged by said projections to throw the frames outwardly to carry said projections into engagement with said track.

13. A rotary cutting reel having outwardly extending arms, a cutting wire stretched between and passed through said arms, means detachably securing said wire at the outer edges of said arms, said means comprising a mounted rotary spindle loosely mounted in ears at the outer edge of an arm and tending to move away from the outer face of the arm, a ratchet wheel and tooth for locking said spindle, one end of the wire wound on the spindle, the tension of the wire holding the wheel and tooth in locking engagement.

14. A cutting reel having outwardly extending arms, a cutting wire stretched between said arms, means for detachably securing the wire and holding the same under tension comprising a loosely mounted rotary spindle on which one end of the wire is wound, and a ratchet wheel and tooth for locking said spindle, the tension of the wire holding the spindle with said wheel and tooth in locking engagement, said spindle being mounted to permit lateral play and normally tending to swing laterally and release said wheel and tooth from locking engagement.

15. In combination, in a cutter for severing plastic material bars into lengths, a traveling table, a rotary cutting reel comprising inwardly and outwardly movable cutting wire frames having controlling projections, a track on which said projections move, an end portion of said track being movable toward and from the reel axis, and means for adjusting said track section independently of the remaining portion of the track.

16. In combination, in a cutter for severing plastic material bars into lengths, an endless traveling table having cutting reel actuating standards, means for guiding and supporting said table, a rotary cutting reel having inwardly and outwardly movable cutting wire frames adapted to be engaged by said standards and provided with stop projections, cam tracks fixed with respect to said frames and along which said projections travel, each track having a pivoted rear end section, and means for adjusting and supporting the same.

17. In a cutter for severing plastic material bars into lengths, in combination, an endless traveling table formed of sections provided with supporting rollers, tracks for said rollers comprising upper and lower horizontal lengths connected by curved end tracks, the curved tracks at the receiving end of the machine formed by a pair of U-shaped angle irons, with their lower horizontal ends longitudinally overlapping the lower horizontal track sections, and their horizontal upper ends longitudinally underlying the upper horizontal track sections, whereby the table rollers drop from said upper horizontal track lengths to said upper horizontal ends and thereby successively downwardly tilt the sections of the table at the delivery end of the machine, and a rotary cutting reel arranged above the delivery end of said table.

18. In a cutter for severing plastic material bars into lengths, in combination, an endless traveling table comprising sections provided with supporting rollers, endless tracks for said rollers comprising upper horizontal angle irons and lower horizontal angle irons, the upper angle irons curved down at the receiving end of the machine to receive the rollers from the lower track lengths, U-shaped angle irons connecting said horizontal lengths at the delivery end of the machine with their ends longitudinally lapping the same and adjustable longitudinally thereof to vary the length of the endless tracks, and means for adjustably securing said U-shaped ends.

19. In combination, in a machine for severing plastic material bars into lengths, an endless traveling table comprising sections provided with supporting rollers, endless tracks for said rollers comprising horizontal upper and lower lengths connected by curved end tracks, the curved tracks at the delivery end of the machine formed by U-shaped angle irons adjustable longitudinally of said upper and lower lengths, means for adjustably securing said angle iron ends, and a delivery platform secured to and carried by said angle iron ends, to receive the severed lengths from the table.

20. In combination, in a machine for severing plastic material bars into lengths, an endless traveling table, and a track therefor comprising overlapping sections, one section being arranged above the other section and having its extremity $4^a$ bent down thereto, substantially as described.

In testimony whereof I affix my signature, in presence of two witnesses.

BYRON ERB BECHTEL.

Witnesses:
 EDWARD PERCY FLINTOFT,
 LAURA ALBERTA ROOS.